United States Patent
Nitta

(10) Patent No.: US 9,093,880 B2
(45) Date of Patent: Jul. 28, 2015

(54) PERMANENT MAGNET MOTOR

(71) Applicant: Kabushiki Kaisha Toshiba, Minato-ku (JP)

(72) Inventor: Isamu Nitta, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 229 days.

(21) Appl. No.: 13/928,769

(22) Filed: Jun. 27, 2013

(65) Prior Publication Data

US 2014/0001891 A1     Jan. 2, 2014

(30) Foreign Application Priority Data

Jun. 29, 2012   (JP) ................................ 2012-146980

(51) Int. Cl.
     *H02K 15/12*      (2006.01)
     *H02K 1/27*      (2006.01)
     *H02K 1/14*      (2006.01)
     *H02K 1/02*      (2006.01)

(52) U.S. Cl.
CPC .............. *H02K 1/2706* (2013.01); *H02K 1/148* (2013.01); *H02K 1/02* (2013.01)

(58) Field of Classification Search
USPC ........ 310/44–45, 216.044, 216.025–216.035, 310/216.067, 216.091
See application file for complete search history.

(56) References Cited

U.S. PATENT DOCUMENTS

| | | | |
|---|---|---|---|
| 2004/0021393 A1* | 2/2004 | Suzuki et al. ................. | 310/218 |
| 2005/0140241 A1* | 6/2005 | Petersen ...................... | 310/216 |
| 2005/0242677 A1* | 11/2005 | Akutsu et al. ................. | 310/179 |
| 2006/0022542 A1* | 2/2006 | Choi et al. .................... | 310/166 |
| 2007/0222306 A1* | 9/2007 | Hultman et al. ............... | 310/44 |
| 2007/0252447 A1* | 11/2007 | Ionel et al. .................... | 310/44 |
| 2008/0054737 A1* | 3/2008 | Inayama et al. ................ | 310/44 |
| 2009/0127971 A1* | 5/2009 | Ishizeki et al. ............... | 310/218 |
| 2009/0127972 A1* | 5/2009 | Ishida et al. .................. | 310/218 |
| 2010/0141059 A1* | 6/2010 | Nishimura ..................... | 310/44 |
| 2010/0156204 A1* | 6/2010 | Endo et al. ..................... | 310/44 |
| 2012/0091832 A1* | 4/2012 | Soderberg ...................... | 310/44 |

FOREIGN PATENT DOCUMENTS

| | | |
|---|---|---|
| JP | 2007-110862 | 4/2007 |
| JP | 2007-110862 A | 4/2007 |
| JP | 2008-245362 | 10/2008 |
| JP | 2008-245362 A | 10/2008 |
| JP | 2011-193573 | 9/2011 |
| KR | 10-2004-0077069 | 9/2004 |
| KR | 10-1143993 | 5/2012 |

OTHER PUBLICATIONS

Notification of Submission of Argument issued Jul. 14, 2014 in Korean Patent Application No. 10-2013-72810 (with English translation).

* cited by examiner

*Primary Examiner* — Thanh Lam
(74) *Attorney, Agent, or Firm* — Oblon, McClelland, Maier & Neustadt, L.L.P.

(57) ABSTRACT

A permanent magnet motor includes a stator core including a core portion and chip portions each formed of dust core, a stator having a coil wound on the stator core and a rotor. The core portion includes steel plates stacked and secured to one another and an annular path portion and salient pole portions. The chip portions are attached to distal ends of the salient pole portions respectively, each chip portion having at least one axial end axially protruding from an axial end of each salient pole portion and one or more radially extending protrusions. The salient pole portions are magnetically routed by the path portion. The salient pole portions have distal end sides formed with recesses capable of accommodating the protrusions, respectively. The protrusions are accommodated in the respective recesses so that the chip portions are attached to the core portion.

8 Claims, 7 Drawing Sheets

PERMANENT MAGNET MOTOR

CROSS-REFERENCE TO RELATED APPLICATIONS

This application is based upon and claims the benefit of priority from the prior Japanese Patent Application No. 2012-146980 filed on Jun. 29, 2012, the entire contents of both of which are incorporated herein by reference.

FIELD

Embodiments described herein relate to a permanent magnet motor.

BACKGROUND

There have conventionally been proposed a configuration of using a dust core (a powder magnetic core) or a pressed powder core in a permanent magnet motor including a stator having a stator core and coils wound on the stator core and a rotor having permanent magnets. The dust core is made by insulating and pressing magnetic powder and has a high degree of freedom in forming. The dust core also achieves downsizing of the stator core. Generally, however, the dust core has a higher magnetic resistance as compared with a silicon steel plate conventionally used as a material for a stator core. As a result, an amount of magnetic flux linkage is reduced when the dust core is used for a longer path of a magnetic circuit. Accordingly, it has been difficult to effectively reduce the loss (iron loss and copper loss) by the configuration of using the dust core in a permanent magnet motor including a stator having a stator core and coils wound on the stator core and a rotor having permanent magnets.

DETAILED DESCRIPTION

In general, according to one embodiment, a permanent magnet motor includes a stator core formed of a soft magnetic material and including a core portion and a plurality of chip portions each comprised of dust core; a stator having a coil wound on the stator core; a rotor having a permanent magnet, wherein the core portion includes a number of steel plates stacked and secured to one another in a direction of a rotation axis, the steel plates being individually insulated from each other, the core portion including an annular path and plurality of salient pole portions; the chip portions are attached to distal ends of the salient pole portions respectively, each chip portion having at least one axial end axially protruding from an axial end of each salient pole portion and one or a plurality of radially extending protrusions; the salient pole portions are magnetically routed by the path portion and extend radially from the path portion; the salient pole portions have distal end sides formed with recesses capable of accommodating the protrusions, respectively; and the protrusions of the chip portions are accommodated in the recesses of the salient pole portions, whereby the chip portions are attached to the core portion.

Several embodiments of compressors will be described with reference to the accompanying drawings. Identical or similar parts will be labeled by the same reference symbols throughout the embodiments. An up-down direction in FIG. 1 corresponds to a direction of rotational axis (axial direction), and a right-left direction corresponds to a radial direction.

Figure 1:
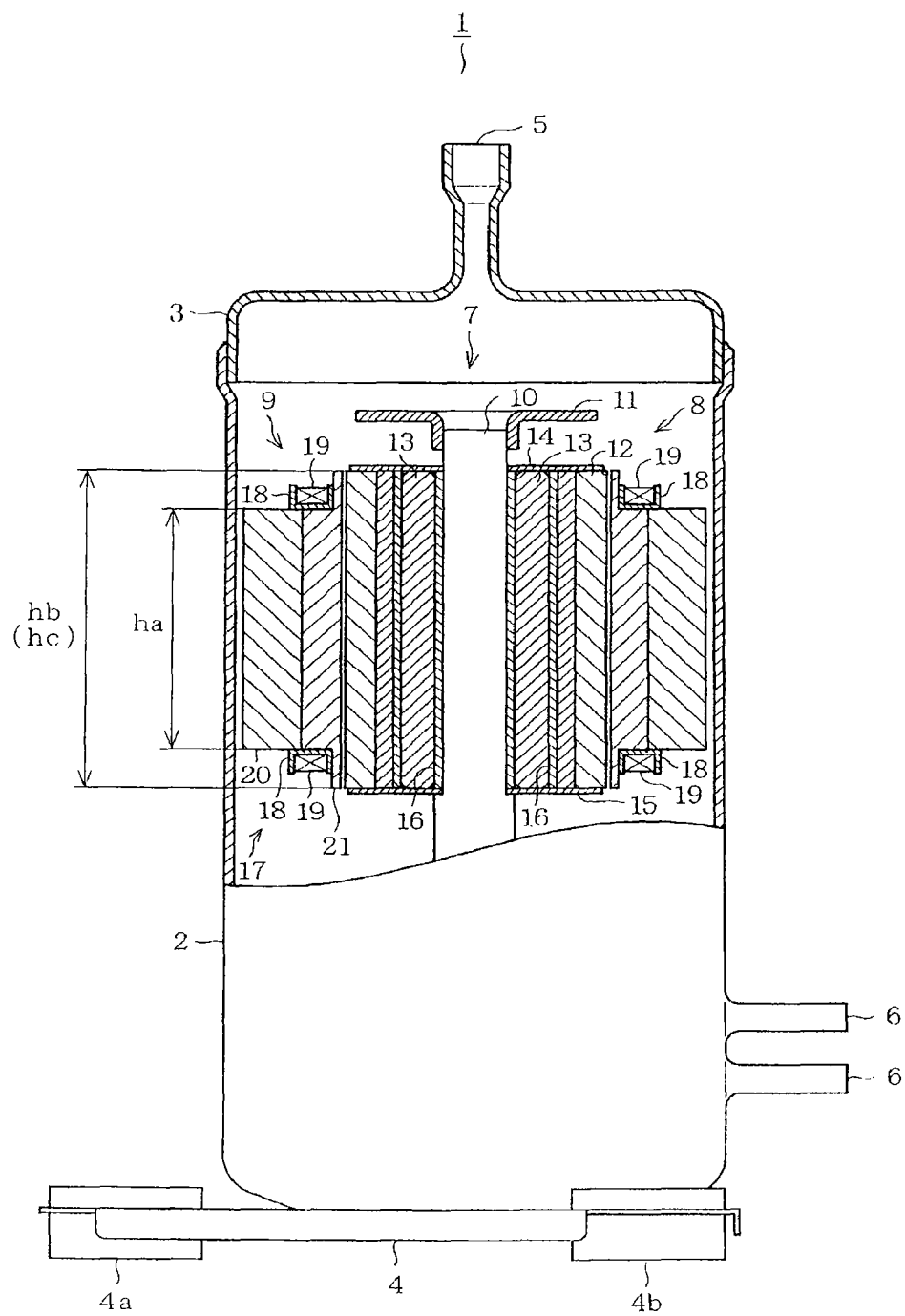
FIG. 1 is a partially broken side view of a compressor employing a permanent magnet motor according to a first embodiment.
Figure 2:
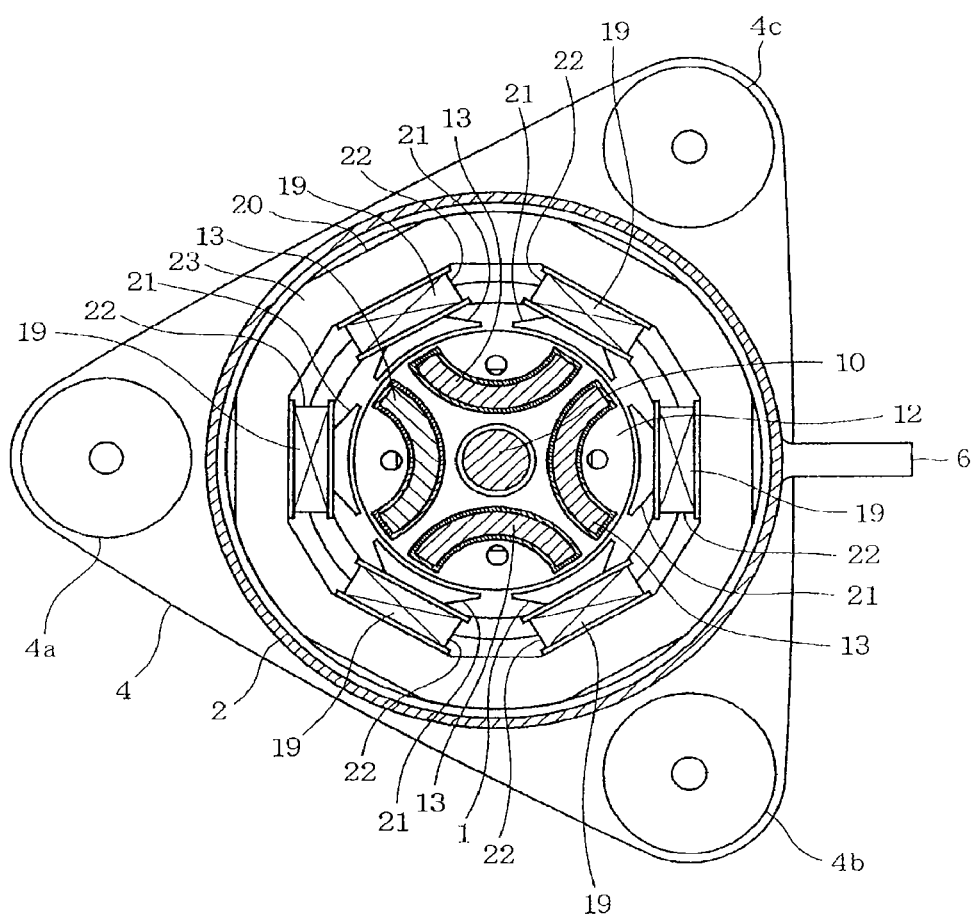
FIG. 2 is a top plan view of the compressor.

A first embodiment will be described with reference to FIGS. 1 to 4B. Referring to FIGS. 1 and 2, a compressor 1 employing a permanent magnet motor according to the first embodiment is used with an air conditioner. The compressor 1 includes a casing 2, a cover 3 and a leg 4. In FIG. 1, a part of the casing 2 is cut away so that a sectional view parallel in the axial direction is obtained.

The casing 2 is formed by deep-drawing a steel plate into a cylindrical shape. The casing 2 has an upper opening. The cover 3 is formed in the same manner as the casing 2 and is mounted to the casing 2 so as to close the upper opening of the casing 2. The leg 4 is formed into a generally triangular plate shape as shown in FIG. 2. The leg 4 includes three rubber installation parts 4a, 4b and 4c. The leg 4 is secured to an underside of the casing 2, for example, by welding. The cover 3 has a refrigerant inlet 5 formed near a central upper part thereof. The casing 2 has refrigerant outlets 6 formed in a lower part thereof. When components including the compressor 1 are assembled into an air conditioner or the air conditioner is completed, pipes or the like are connected to the inlet 5 and the outlets 6, whereby an enclosed space is defined.

An electric motor 7 is enclosed in the compressor 1. The motor 7 is a permanent magnet motor of the inner rotor type and also a radial gap motor having a gap between an outer periphery of a rotor 8 and an inner periphery of a stator 9. The rotor 8 includes a rotating shaft 10, a refrigerant deflecting member or a baffle plate 11, a rotor core 12, permanent magnets 13, a rotor upper cover 14 and a rotor lower cover 15. The rotating shaft 10 is made of iron and is located in the center of the motor 7. The rotating shaft 10 is rotatably supported on a compressor mechanism (not shown) disposed in the casing 2. The rotating shaft 2 has an upper end with which the refrigerant deflecting member 11 is fitted to be secured thereto. Refrigerant entering through the inlet 5 is diverged to an outer periphery as the result of provision of the refrigerant deflecting member 11.

The rotor core 12 is formed by stacking and securing silicon steel plates into a cylindrical shape. The rotor core 12 is formed with a centrally located circular hole. The rotating shaft 10 is inserted through the circular hole of the rotor core 12 to be secured in the circular hole. As shown in FIG. 2, the rotor core 12 also has four slots 16 into which four permanent magnets 13 are inserted respectively as will be described later. The cover 3, the refrigerant deflecting member 11 and the rotor upper cover 14 are not shown in FIG. 2. Each slot 16 has a generally C-shaped section and includes a convex surface opposed to the rotating shaft 10.

Each permanent magnet 13 is comprised of strontium ferrite, for example and has a section formed into the same shape (C-shape) as each slot 16. The four permanent magnets 13 are inserted into the slots 16 respectively as described above.

More specifically, the four permanent magnets 13 are arranged so that the convex surfaces of the magnets are opposed to the rotating shaft 10 (an inverted arc arrangement). Each permanent magnet 13 has the convex surface and a concave surface of the C-shaped section, which convex and concave surfaces have different magnetic poles. The permanent magnets 13 are further disposed so that circumferentially adjacent magnets have opposite magnetic poles. The rotor core 12 has two axial ends to which a disc-shaped brass rotor upper cover 14 and a rotor lower cover 15 are secured respectively. The provision of the rotor upper and lower covers 14 and 15 prevents dropout of the permanent magnets 13.

The stator 9 includes a stator core 17, a bobbin 18 and coils 19. The stator core 17 has a laminated core 20 (serving as a core portion) and six chip portions 21. The laminated core 20 is formed by stacking and securing silicon steel plates (serving as steel plates) and constitutes an outer periphery of the stator core 17. The laminated core 20 is disposed along an inner periphery of the casing 2 and includes six teeth 22 (serving as a salient pole) and an annular yoke 23 (serving as a path portion). The teeth 22 are located at an inner peripheral side of the laminated core 20. The yoke 23 is located at an outer peripheral side of the laminated core 20 and magnetically routes the teeth 22. The teeth 22 are formed so as to radially extend from an inner circumferential surface of the yoke 23 toward the rotor 8. The teeth 22 are disposed equi-angularly.

The teeth 22 have distal ends or teeth heads (ends at the rotor 8 side) formed with chip portions 21 respectively. The chip portions 21 are formed of dust core that is nondirectional with respect to a space. Each chip portion 21 has a generally trapezoidal section, so that a peripheral width at the inner peripheral side is larger than a width at the outer peripheral side. Each chip portion 21 has an inner peripheral surface which is formed into a shape (arc shape) such that the inner peripheral surface is opposite to an outer circumferential surface of the rotor core 12 with a predetermined gap therebetween. Each chip portion 21 has an outer peripheral surface a part of which is in contact with a distal end surface (inner side) of the corresponding tooth 22. This part of each chip portion 21 has the same width as the distal end surface of the corresponding tooth 22.

The distal end of each tooth 22 or a part of each tooth 22 in contact with the chip portion 21 has an axial dimension ha that is set so as to be smaller than an axial dimension hb of the gap defining surface of the inner circumference of each chip portion 21. The axial dimension hb of each chip portion 21 is further set so as to be equal to an axial dimension hc of each permanent magnet 13 of the rotor 8. Thus, the axial dimensions ha, hb and hc have the relationship as shown in the following equation (1):

$$ha < hb = hc \tag{1}$$

Each chip portion 21 is mounted to the distal end of the corresponding tooth 22 so that both axial ends of each chip portion 21 axially protrude beyond the axial ends of the corresponding tooth 22. Six bobbins 18 each formed of a PET resin are fitted with the teeth 22. Coils 19 are wound on the bobbins 18 respectively. Each coil 19 is made of a copper wire with insulation coating, for example. The coils 19 are three-phase connected so that diagonally opposed coils 19 (coils opposed to each other with the rotating shaft 10 being located therebetween) belong to the same phase.

Figure 3:
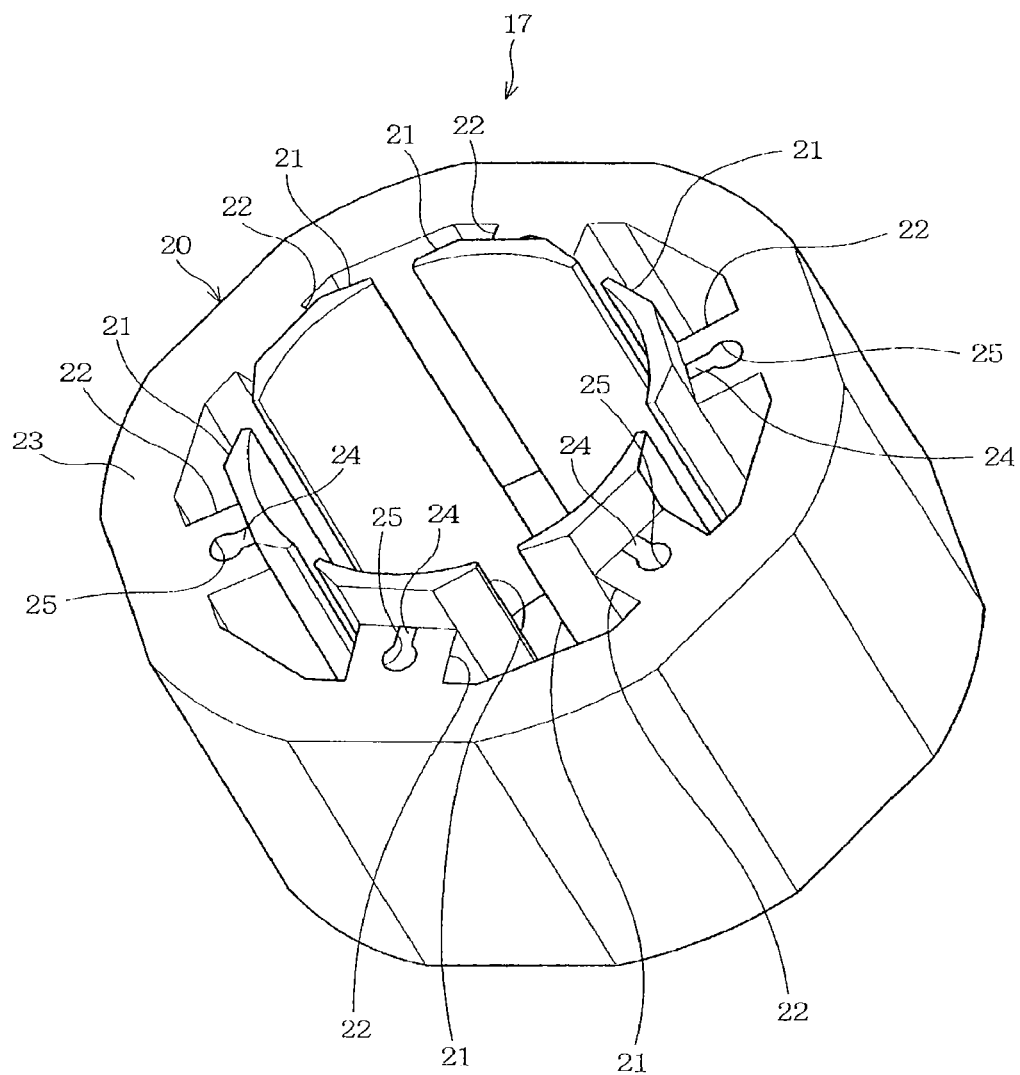
FIG. 3 is a perspective view of a part of motor stator.

A magnetic circuit of the stator 9 will now be described with reference to FIG. 3. Each chip portion 21 is formed with a protrusion 24 which protrudes radially from the outer surface thereof and further extends axially linearly. The protrusion 24 has an inner circumferential section that is rectangular in shape and an outer circumferential section that is circular in shape. Each protrusion 24 is located at a part of the chip portion 21 brought into contact with the corresponding tooth 22 of the laminated core 20. More specifically, no protrusion 24 is provided on a part of each chip portion 21 protruding axially beyond the tooth 22. The teeth 22 have distal end (inner side end) side surfaces formed with axially extending groove-like recesses 25 respectively. Each recess 25 defines a space capable of accommodating the protrusion 24 of the corresponding chip portion 21 without gap (in a tight state). When the protrusions 24 are accommodated in or set in the recesses 25 to be secured in the recesses 25, whereby the chips 21 are mounted to the distal ends of the teeth 22 of the laminated core 20, respectively.

The following method (a manufacturing method) may be employed for the mounting of the chip portions 21 to the respective teeth 22. When dust core to be formed into the chip portion 21 is pressurized, at least a part of the teeth 22 of the laminated core 20 are put into a forming die of the dust core so that the chip portions 21 and the teeth 22 are integrally formed with each other. As a result, the chip portions 21 are secured to the teeth 22 of the laminated core 20 respectively.

The protrusions and recesses 24 and 25 are formed into the respective above-described shapes in order that the chip portions 21 and the teeth 22 may strongly be joined together for the purpose of preventing the chip portions 21 from dropping out of the laminated core 20. Accordingly, the protrusions and recesses 24 and 25 may be formed into respective any shapes that can prevent the chip portions 21 from dropping out of the laminated core 20. For example, each protrusion 24 may have a rectangular or inversely tapered (trapezoidal) section at the outer side thereof. When each protrusion 24 has a rectangular section at the outer side thereof, the circumferential dimension or width of each protrusion 24 at the outer side needs to be set so as to be larger than the circumferential dimension or width at the inner side in order that an advantageous effect of preventing each chip portion 21 from dropping out of the laminated core 20 may be achieved. Additionally, even in the case where the above-mentioned dropout preventing effect can be achieved by the configuration of another portion, the circumferential dimension or width of each protrusion 24 at the outer side may be set so as to be equal to or smaller than the circumferential dimension or width at the inner side when each protrusion 24 has a rectangular section at the outer side thereof.

The above-described configuration will work as follows. In the compressor 1, refrigerant flows through a passage as described below. The refrigerant of the air conditioner flowing through the inlet 5 into the compressor interior flows between the rotor core 12 and the stator core 17 (the laminated core 20 or the chip portions 21) to the lower interior of the compressor 1. The refrigerant further passes through a compressor mechanism in which a compressive force is generated by rotation of the rotor 8, flowing through the outlets 6 out of the compressor 1.

Magnetic flux generated by a predetermined permanent magnet 13 and axially converged by a predetermined chip portion 21 passes through the tooth 22 secured to the predetermined chip portion 21, the yoke 23 and other teeth 22, returning to another permanent magnet 13. In the configuration of this magnetic circuit, the axial dimension ha of a part (each tooth 22) of the laminated core 20 on which the coil 19 is to be wound is rendered shorter than the axial dimension hc of each permanent magnet 13. This can render a circumferential dimension of the copper wire composing the coil 19 shorter than that in the conventional configuration in which the axial dimension hc is equal to the axial dimension ha, with the result that copper loss is reduced in each coil 19.

In this regard, there is a possibility that the magnetic flux generated by each permanent magnet 13 may leak in the configuration that the axial dimension ha is shorter than the axial dimension hc. In the embodiment, however, the chip portions 21 comprised of the dust core nondirectional with respect to the space are mounted to the distal ends of the teeth 22 respectively. Furthermore, the axial dimension hb of each chip portion 21 is equal to the axial dimension ha of each permanent magnet 13. As a result, the magnetic flux generated by each permanent magnet 13 is axially converged by each chip portion 21. Accordingly, the magnetic flux generated by the permanent magnets 13 is converged without leaking large, flowing into the laminated core 20 side into linkage with the coils 19. Thus, the embodiment can reduce copper loss in the coils 19 and iron loss in the laminated core 20, that is, loss in the motor 7 as compared with the conventional configuration.

The protrusions 24 formed on the chip portions 21 are accommodated in the recesses 25 formed in the teeth 22, whereby the chip portions 21 and the teeth 22 are secured together, respectively. That is, the chip portion 21 side of a boundary (a contact portion) between each chip portion 21 and the corresponding tooth 22 is formed so as to be convex. As a result, each chip portion 21 is convex toward the tooth 22 when an axial section of each chip portion 21 is viewed. This configuration renders an axial area larger as compared with the configuration in which the chip portion 21 side of a boundary between each chip portion 21 and the corresponding tooth 22 is formed so as to be concave. When the axial section of each chip portion is rendered larger, magnetic saturation is less likely to occur with the result that an amount of magnetic flux linkage that is the source of the torque of the motor 7 is increased. Furthermore, since the sectional area of the contact portion between each chip portion 21 and the corresponding tooth 22 is increased, an adhesion area is increased or the frictional force is improved, whereupon a fixing strength can be increased.

Figure 4A:
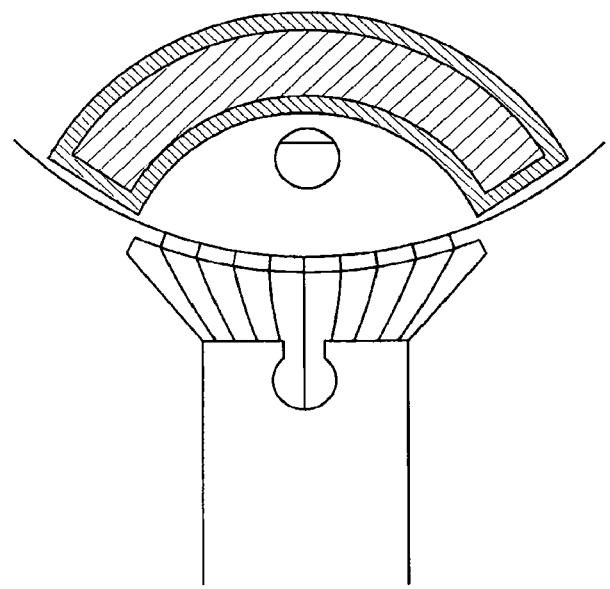
FIGS. 4A and 4B are a top plan view of a part of the stator and a part of the rotor of the permanent magnet motor and a graph showing flux content converged on the laminated core, respectively.
Figure 4B:
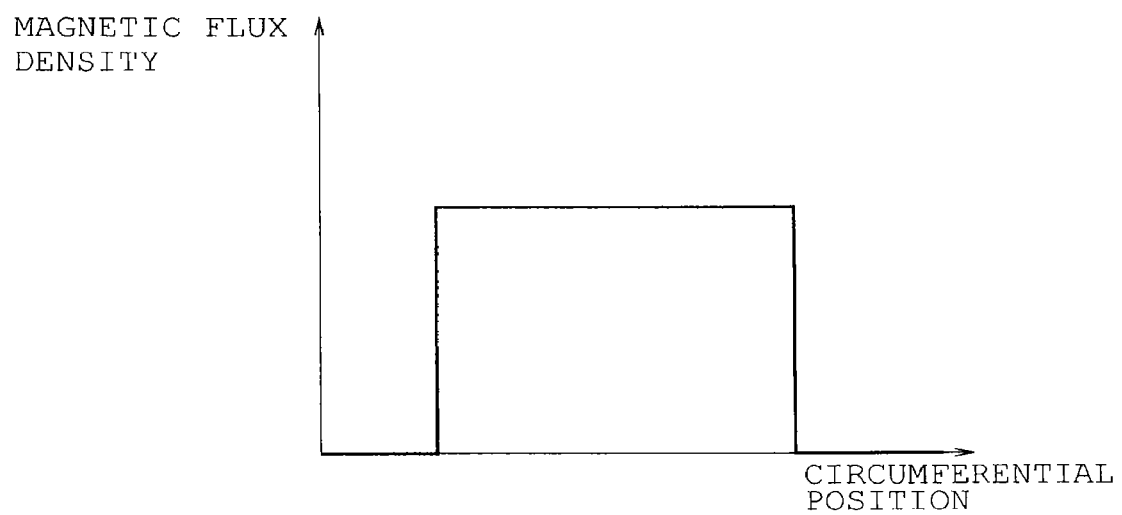
Figure 5A:
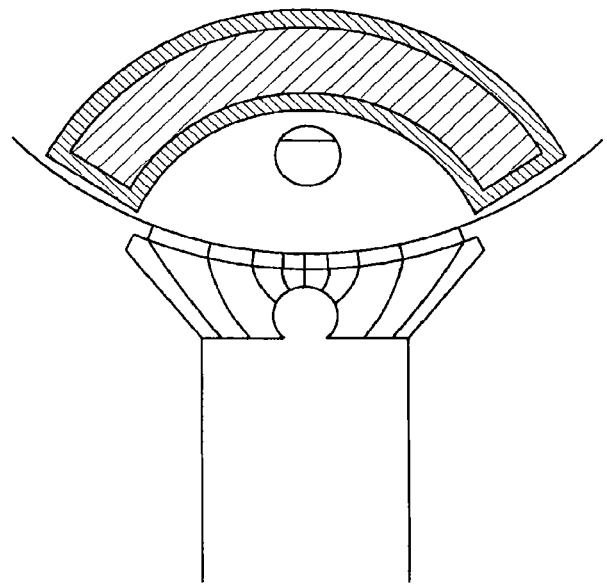
FIGS. 5A and 5B are views similar to FIGS. 4A and 4B, showing the related art, respectively.
Figure 5B:
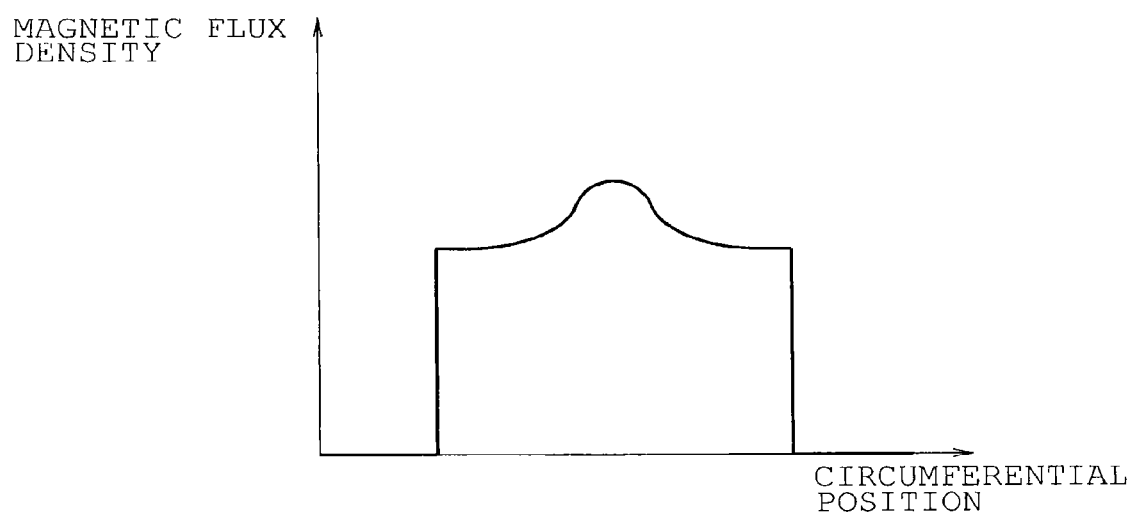

According to the embodiment in which each chip portion 21 side is formed to be convex, furthermore, the following advantageous effects can be achieved as compared with the configuration (hereinafter, "related configuration") that each chip 21 side is formed so as to be concave. In the related configuration, a circumferentially central part of each chip portion 21 has a smaller radial dimension as compared with the other part, as shown in FIG. 5A. On the other hand, in the configuration of the embodiment, a circumferentially central part of each chip portion 21 does not have a smaller radial dimension as compared with the other part, as shown in FIG. 4A. In other words, in the related configuration, the distance from the rotor core 12 to each tooth 22 is shorter in the circumferentially central part as compared with the configuration of the embodiment. Each tooth 22 comprised of the steel plate has a smaller magnetic resistance than each chip portion 21 comprised of the dust core. Accordingly, magnetic flux generated by the permanent magnets 13 and flowing through the rotor core 12 flows concentrically into the circumferentially central part of each tooth 22 in the related configuration (see FIG. 5B). Thus, magnetic flux bias results in occurrence of torque ripple in the motor 7, with the result that rotation of the motor 7 becomes non-smooth. Non-smooth rotation results in problems of occurrence of vibration, noise and the like. On the contrary, in the embodiment configuration, the magnetic flux generated by the permanent magnets 13 and flowing through the rotor core 12 further flows substantially uniformly through an entire circumference of each tooth 22 (see FIG. 4B). Since the deviation of the magnetic flux is unlikely to occur, the above-described problem resulting from torque ripple does not occur in the embodiment configuration.

It is considered that minute gaps tend to be formed in the contact surfaces in the above-described configuration. However, since an axial end surface of each protrusion 24 is exposed in the embodiment, each protrusion 24 can directly be pressurized using a metallic mold. As a result, the density of the contact surfaces can easily be improved, so that occurrence of minute gaps can be reduced. Furthermore, an increase in the magnetic resistance can be suppressed by an increase in the contact surface, and an amount of magnetic flux linkage can be prevented from being reduced. In addition, a thermal treatment, for example, at 600° C. is sometimes carried out after pressing to alleviate magnetic distortion. In this case, each protrusion 24 contracts though an amount of contraction is small. According to the above-described embodiment configuration, each recess 25 which has been spread in the pressing returns to a previous state due to elastic deformation, with the result that the fixing strength of the contact surfaces can be maintained. Thus, according to the embodiment, a reliable fixing strength can be ensured in the contact portions and an amount of magnetic flux linkage can be increased, with the result that the above-described effect of loss reduction in the motor 7 can reliably be obtained.

The dust core generally costs more than a silicon steel plate. In the embodiment, the chip portions 21 constituting a part of the stator core 17 are comprised of the dust core. Accordingly, the manufacturing cost of the stator core 17 can be rendered lower in the embodiment than in the configuration that the whole stator core 17 is comprised of the dust core. For comparison, when the whole stator core 17 is comprised of the dust core, a magnetic circuit formed of the dust core is rendered longer with the result that an amount of magnetic flux linkage is reduced, as described in the BACKGROUND. On the contrary, the configuration of the embodiment can suppress occurrence of the above-described problem.

When the dust core to be formed into the chip portions 21 is pressurized, at least parts of the teeth 22 of the laminated core 20 are inserted into the forming die for the dust core so that the teeth 22 are integrally formed with the chip portions 21, whereby the chip portions 21 are secured to the respective teeth 22. More specifically, a process of forming the chip portions 21 of the dust core is executed simultaneously with a process of mounting the chip portions 21 to the respective teeth 22. Consequently, the number of processes in the manufacture of the motor 7 can be reduced with the result that the manufacturing cost can be reduced.

Figure 6:
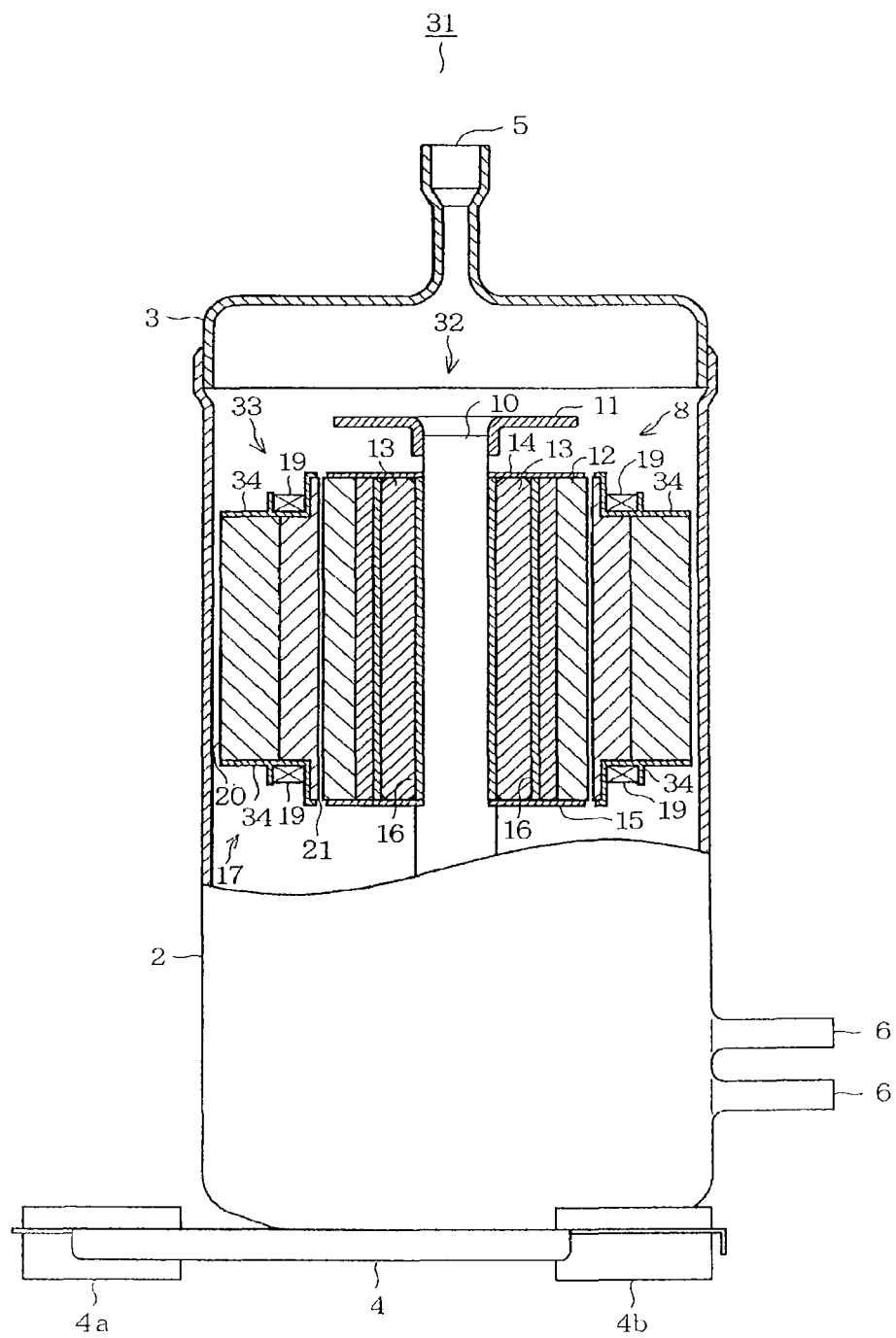
FIG. 6 is a view similar to FIG. 1, showing a second embodiment.

FIG. 6 illustrates a second embodiment. A compressor 31 of the embodiment as shown in FIG. 6 includes an electric motor 32 (a permanent magnet motor) which differs from the motor 7 in the first embodiment in the configuration of the stator 33. The stator 33 of the motor 32 differs from the stator 9 of the motor 7 in that stator 33 employs resin mold 34 (serving as resin) as an insulating material for insulating between the stator core 17 and the coils 19, instead of the bobbin 18.

In the second embodiment, the teeth 22 and the chip portions 21 are integrally molded from a resin mold 34 into one piece in a condition where the chip portions 21 are mounted to the respective teeth 22 of the laminated core 20 or where the protrusions 24 are accommodated in the recesses 25, whereby the chips 21 are secured to the distal ends of the teeth 22, respectively. The coils 19 are wound on the teeth 22 with the resin mold 34 being interposed therebetween. According to the above-described configuration, since a process of mounting an insulating material or member such as bobbin to the teeth 22 is not necessitated, the number of processes in the manufacture of the motor 32 is reduced with the result of reduction in the manufacturing cost.

Figure 7:
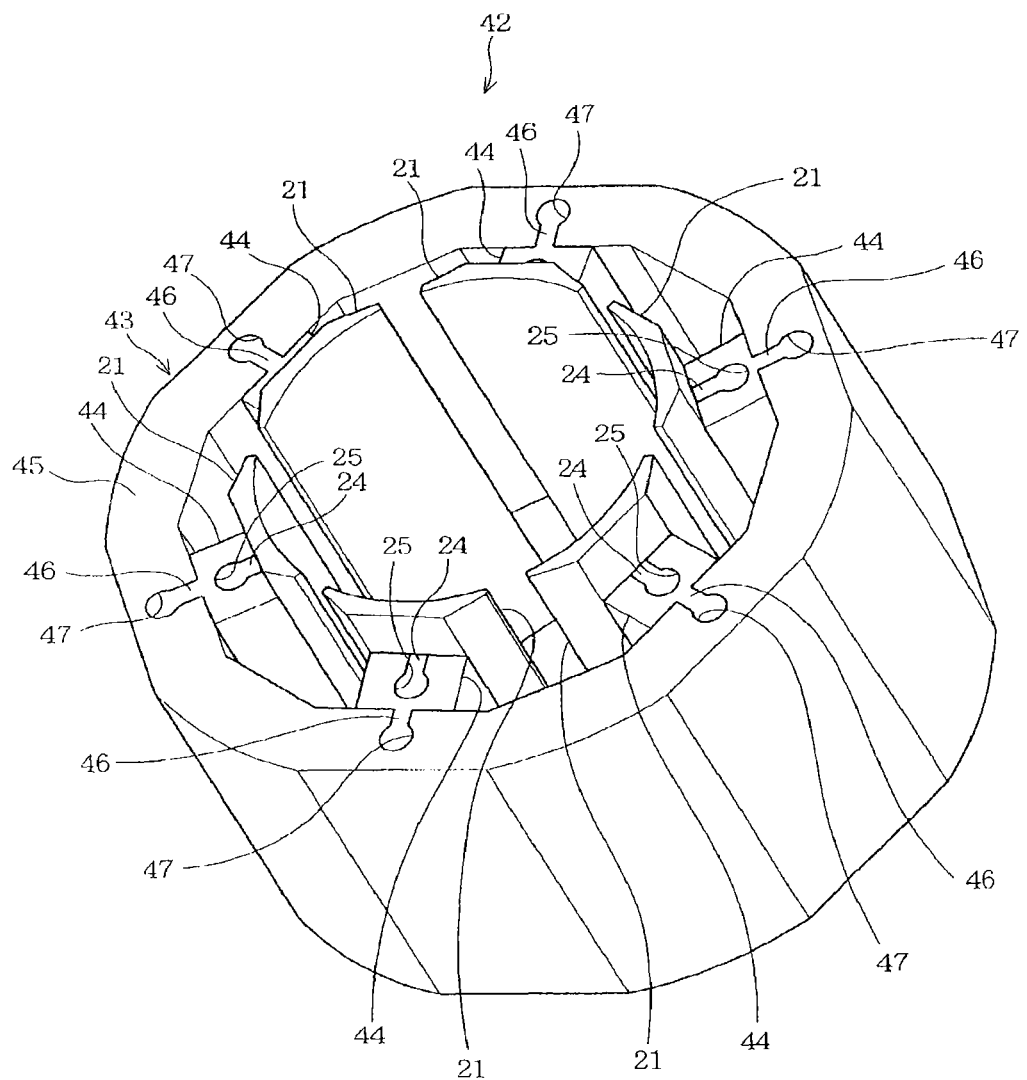
FIG. 7 is a view similar to FIG. 3, showing a third embodiment.

FIG. 7 illustrates a third embodiment. A stator core 42 in the third embodiment as shown in FIG. 7 is a split core. More specifically, the stator core 42 includes a laminated core 43 (serving as a core portion) and six chip portions 21. The laminated core 43 includes six teeth 44 (serving as salient pole portions) and an annular yoke 45 (serving as a path). The teeth 44 are located at the inner circumferential side of the laminated core 43. A yoke 45 is located at the outer circumferential side of the laminated core 43 and magnetically routes the teeth 44. However, the teeth 44 and the yoke 45 are separable from each other and individually configured (as separate members).

Each tooth 44 has a protrusion 46 extending in the outer circumferential direction from the outer circumference thereof. The protrusion 46 has the same shape as the protrusion 24 of each chip portion 21. The yoke 45 has an inner circumference formed with a recess 47. The recess 47 has the same shape as the recess 25 of each tooth 22. The protrusions 46 are fitted into the recesses 47 to be secured therein, respectively, whereby the laminated core 43 is formed.

A method of manufacturing the above-described stator core 42 can employ the following manner as described below. Firstly, six teeth 44 separated from the yoke 45 are secured to six chip portions 21 respectively. Subsequently, six secured pairs of teeth 44 and the chip portions 21 are secured to the yoke 45, whereby the stator core 42 is formed. According to the embodiment employing the above-described split core configuration, the coils 19 can easily be wound on the respective teeth 44, whereby the production efficiency can be improved.

According to the above-described configuration, when the dust core formed into the chip portions 21 is pressurized, apart of or an entire each tooth 44 is inserted into the molding die of dust core to be integrally formed with the chip portion 21, whereupon the chip portions 21 can easily be secured to the teeth 44 respectively. Consequently, no pressure is applied to at least the yoke 45 of the laminated core 43 during the molding of dust core with the result that there is no possibility of a problem of deformation and/or the like with pressure application.

Although several embodiments have been described, these embodiments are illustrative but should not be restrictive. The embodiments can be put into practice in various forms, and various eliminations, replacements and changes can be made without departing from the gist of the invention.

The embodiments may be applied to overall radial gap motors employing permanent magnets. Accordingly, the motors should not be limited to of the inner rotor type but may be of the outer rotor type. The use of the motor should not be limited to the compressor of the air conditioner but may be used for compressors of refrigerators or drive systems of washing machines.

Each chip portion 21 may have the protrusion 24 located at a part thereof protruding axially farther than the tooth 22, that is, may be configured so that the protrusion 24 extends to the end of each chip portion 21. This configuration has the following advantage. In each of the above-described embodiments including the protrusion 24 not extending to the end of each chip portion 21, when the dust core is pressurized in the molding die to be solidified, a sufficient pressure is applied to the protrusion 24 but is unlikely to be applied to the distal end (a part facing the permanent magnet 13, namely, the inner circumference) of each chip portion 21. This results in difficult adjustment of pressure to be applied. More specifically, in the configuration that the protrusion 24 does not extend to the end of each chip portion 21, the dust core cannot be pressurized well in the molding die. On the other hand, in the configuration that the protrusion 24 extends to the end of each chip portion 21, the above-mentioned disadvantage cannot be found. However, when the protrusion 24 extends to the end of each chip portion 21, the protrusion 24 located at the portion of each chip portion 21 protruding axially farther than the tooth 22 would disturb the winding of the coil 19. In this case, furthermore, since the coil 19 is wound onto both ends of the protrusion 24, the length of the copper wire constituting the coil 19 is accordingly increased.

Each chip portion 21 may be mounted to the distal end of the tooth 22 so that at least one axial end thereof axially protruding farther than the axial end of the tooth 22.

Each chip portion 21 may have a plurality of protrusions and each tooth 22 or 44 may have a plurality of recesses, so that the chips 21 may be mounted to distal ends of the teeth 22 or 44 by accommodating or placing the protrusions in the recesses, respectively.

The axial dimension hb of each chip portion 21 may be or may not be set to be equal to the axial dimension hc of each permanent magnet 13. For example, the axial dimension hb may be set to be slightly larger that the axial dimension hc (hb>hc). In this case, more magnetic flux can be taken or converged from the ends of the permanent magnets 13. Furthermore, for example, the axial dimension hb may be set to be slightly smaller than the axial dimension hc (hb<hc). In this case, since the size of each chip portion 21 to be formed of the dust core is rendered smaller, the manufacturing cost of the stator core 17 can be reduced accordingly.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A permanent magnet motor comprising:
    a stator core formed of a soft magnetic material and including a core portion and a plurality of chip portions each comprised of dust core portion;
    a stator having a coil wound on the stator core;
    a rotor having a permanent magnet,
    wherein the core portion includes a number of steel plates stacked and secured to one another in a direction of a rotation axis, the steel plates being individually insulated from each other, the core portion including an annular path portion and a plurality of salient pole portions;
    the chip portions are attached to distal ends of the salient pole portions respectively, each chip portion having at least one axial end axially protruding from an axial end of each salient pole portion and one or a plurality of radially extending protrusions;
    the salient pole portions are magnetically routed by the path portion and extend radially from the path portion;
    the salient pole portions have distal end sides formed with recesses capable of accommodating the protrusions, respectively; and the protrusions of the chip portions are accommodated in the recesses of the salient pole portions, whereby the chip portions are attached to the core portion.

2. The permanent magnet motor according to claim 1, wherein when the dust core to be formed into the chips is shaped, parts of the distal end sides of the salient portions are inserted into a shaping die so that the chip portions and the parts of the distal end sides of the salient portions are formed integrally with each other, whereby the protrusions are accommodated in the recesses respectively.

3. The permanent magnet motor according to claim 1, wherein the salient pole portions and the chip portions of the stator core are formed integrally with each other from a resin to insulate the salient pole portions and the chip portions from the coil.

4. The permanent magnet motor according to claim 2, wherein the salient pole portions and the chip portions of the stator core are formed integrally with each other from a resin to insulate the salient pole portions and the chip portions from the coil.

5. The permanent magnet motor according to claim 1, wherein the path portion and the salient pole portions are formed independently of each other.

6. The permanent magnet motor according to claim 2, wherein the path portion and the salient pole portions are formed independently of each other.

7. The permanent magnet motor according to claim 3, wherein the path portion and the salient pole portions are formed independently of each other.

8. The permanent magnet motor according to claim 4, wherein the path portion and the salient pole portions are formed independently of each other.

* * * * *